United States Patent
Ruyle et al.

(10) Patent No.: US 7,532,614 B2
(45) Date of Patent: May 12, 2009

(54) METHODS AND APPARATUS FOR FACILITATING REMOTE COMMUNICATION WITH AN IP NETWORK

(75) Inventors: Kenney Ruyle, Campbell, CA (US); Michael Ruyle, Campbell, CA (US); Anil Punjabi, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 942 days.

(21) Appl. No.: 10/253,739

(22) Filed: Sep. 24, 2002

(65) Prior Publication Data

US 2004/0057435 A1    Mar. 25, 2004

(51) Int. Cl.
*H04L 12/28* (2006.01)
(52) U.S. Cl. .............. 370/352; 370/389; 370/395.5; 370/475
(58) Field of Classification Search ............. 370/235, 370/352, 389, 392, 401, 475, 395.52, 395.5, 370/395.51
See application file for complete search history.

(56) References Cited

U.S. PATENT DOCUMENTS

| | | | | |
|---|---|---|---|---|
| 6,108,704 | A * | 8/2000 | Hutton et al. .............. 709/227 |
| 6,215,783 | B1 | 4/2001 | Neyman .................... 370/353 |
| 6,304,565 | B1 | 10/2001 | Ramamurthy ............... 370/352 |
| 6,337,858 | B1 | 1/2002 | Petty et al. ................. 370/356 |
| 6,373,857 | B1 | 4/2002 | Ma .......................... 370/475 |
| 6,374,302 | B1 | 4/2002 | Galasso et al. ............. 709/238 |
| 6,426,942 | B1 | 7/2002 | Sienel et al. ............... 370/235 |
| 6,510,154 | B1 * | 1/2003 | Mayes et al. .............. 370/389 |
| 6,822,955 | B1 * | 11/2004 | Brothers et al. ........... 370/389 |
| 7,068,655 | B2 * | 6/2006 | March et al. .............. 370/392 |
| 7,099,301 | B1 * | 8/2006 | Sheu ........................ 370/352 |
| 2002/0186685 | A1 * | 12/2002 | O'Brien et al. ............ 370/352 |
| 2002/0186698 | A1 * | 12/2002 | Ceniza ..................... 370/401 |
| 2002/0194378 | A1 * | 12/2002 | Foti ......................... 709/246 |
| 2003/0033418 | A1 * | 2/2003 | Young et al. ............... 709/230 |
| 2003/0200298 | A1 * | 10/2003 | Su et al. ................... 709/223 |
| 2007/0143397 | A1 * | 6/2007 | Guedalia et al. ........... 709/203 |

OTHER PUBLICATIONS

"IEC: Voice over Internet Protocol", download from http://www.iec.org/online/tutorials/int_telt/topic01.html on Aug. 23, 2002. 12pgs.

(Continued)

*Primary Examiner*—Chi H. Pham
*Assistant Examiner*—Shick Hom (57) ABSTRACT

A system, method, apparatus, and computer program code for facilitating communication via an IP network. According to some embodiments of the present invention, a proxy device is positioned topologically between an IP enabled communication device (e.g., an IP telephone) and an IP based network. The proxy device may establish a remote access connection to the network before or after receiving a request from the IP enabled communication device to communicate to or via the network. The proxy device then facilitates communication between the IP enabled communication device and the network. In addition, the proxy device may modify source and/or destination IP addresses in messages or other communications received from the IP enabled communication device prior to sending such messages or other communications to the network and may modify source and/or destination IP addresses in messages or other communications received from the network prior to sending such messages or other communications to the IP enabled communication device.

8 Claims, 7 Drawing Sheets

OTHER PUBLICATIONS

"H.323 Protocols", download from http://protocols.com/pbook/h323.htm on Aug. 23, 2002. 16pgs.

Tyson, Jeff, Howestuffworks "How IP Telephony Works", download from http://www.howstuffworks.com/ip-telephonyl.htm on Aug. 23, 2002. Copyright © 1998-2002. Howstuffworks, Inc. 13pgs.

"Pocket-based multimedia communications systems" ITU-T H.323, Nov. 2002, Draft Version 4, International Telecommunication Union. 227pgs.

Rosenberg, et al., "SID. Session Initiation Protocol", Network Working Group, Jun. 2002, Copyright © The Internet Society (2002). 269pgs.

* cited by examiner

METHODS AND APPARATUS FOR FACILITATING REMOTE COMMUNICATION WITH AN IP NETWORK

BACKGROUND OF THE INVENTION

The present invention relates to a method and apparatus for facilitating communication with an IP network by a remotely located IP enabled communication device.

Many companies and organizations allow employees, members, customers, etc. to log onto and use their company communication networks. For example, a company may allow an employee to telecommute at least part of the time, during which the employee may work out of a home office and access the company's network from a computer or other device in the home office. As another example, a salesperson for a company may access the company's network from various remote locations (e.g., potential customers' offices, hotel rooms) as the salesperson travels.

In some circumstances, a company network may comprise or include a network capable of using internet protocols (IP) for communication. A company network may be an H.323 or SIP (Session Initiation Protocol) based telephony network that uses packet switch connections to exchange voice, facsimile, data, and other communications that traditionally may have been carried over switched telephone networks (with private branch exchanges).

Unfortunately, in order for a remotely located IP enabled communication device such as a remote IP enabled telephone to connect to an IP telephony or other IP based network, the remote IP enabled communication device may need to execute some sort of login or authentication process with the network to which it desires access. Since the remote IP enabled communication device may not include the software necessary to create a remote access connection to the network, it may be unsuitable for use at the remote location.

It would be advantageous to provide a method and apparatus that facilitated communication to or through an IP based network for or on behalf of a remote IP enabled communication device to access and communicate with another network.

SUMMARY OF THE INVENTION

Embodiments of the present invention provide a system, method, apparatus, means, and computer program code for facilitating communication by a remotely located IP enabled communication device with an IP based network. In addition, embodiments of the present invention provide a system, method, apparatus, and computer program code for allowing an IP enabled communication device to remotely access an IP based network such as an H.323, SIP, or other IP telephony network.

According to some embodiments of the present invention, a proxy device is positioned topologically between a remote IP enabled communication device (e.g., an IP telephone) and an IP based network. The proxy device may establish a remote access connection to the network before or after receiving a request from the IP enabled communication device to communicate to or via the network. The proxy device then facilitates communication between the IP enabled communication device and the network and/or between the IP enabled communication device and another IP enabled communication device that is included in or connected to the network. The operation of the proxy device may be partially or completely transparent to the IP enabled communication device and/or the network or other IP enabled communication device. In addition, the proxy device may modify source and/or destination IP addresses in messages or other communications received from the IP enabled communication device prior to sending such messages or other communications to the network. Similarly, the proxy device modifies source and/or destination IP addresses in messages or other communications received from the network prior to sending such messages or other communications to the IP enabled communication device.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF SPECIFIC EMBODIMENTS

Applicants have recognized that there is a market opportunity for systems, means, computer code and methods that facilitate communication by a remote device to an H.323, SIP (Session Initiation Protocol), or other IP (Internet Protocol) based network. In addition, applicants have recognized that there is a market opportunity for systems, means, computer code and methods that allow a remotely located IP enabled communication device (e.g., IP enabled telephone, IP enabled database server, a gatekeeper or registrar device) to communicate with another IP enabled communication device via an IP network, such as a company or private network. Some embodiments of the present invention provide such capabilities by providing a proxy device (e.g., a computer, server, or other device having specific software thereon) to act as an intermediary between the remotely located IP enabled communication device and the IP based network to which access is desired. The proxy device may initiate and maintain a connection with the IP network on behalf of the IP enabled communication device such that the remote IP enabled communication device can communicate via the proxy device with other networked devices connected to or part of the IP network and such that other networked devices can communicate with the remote IP enabled communication device via the proxy device. These and other features will be discussed in further detail below, by describing a system, individual devices, means, and processes according to embodiments of the invention.

System

Figure 1:
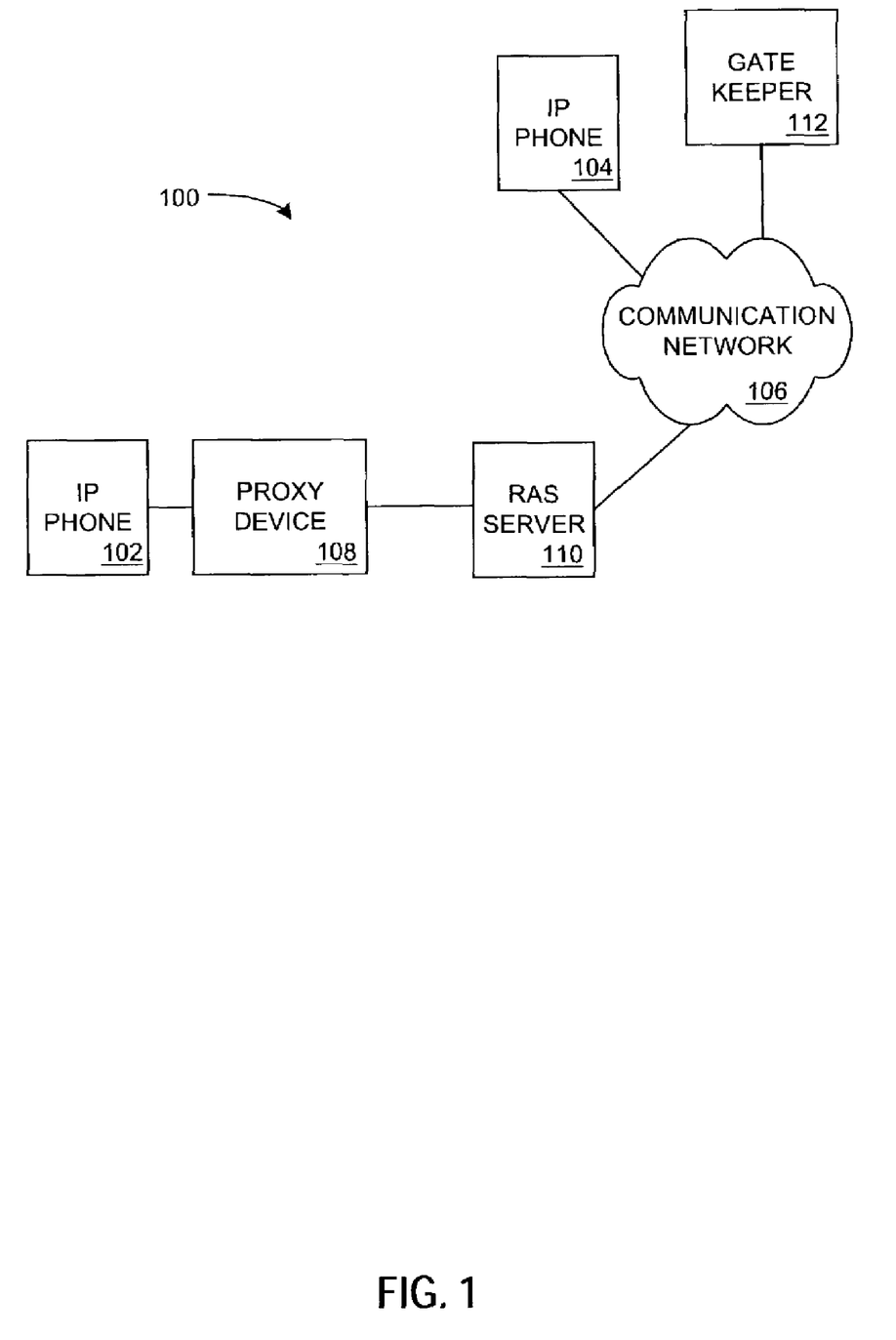
FIG. 1 is a block diagram of system components of an apparatus usable with embodiments of present invention.

Now referring to FIG. 1, a representative system 100 with the methods disclosed herein according to the present invention is illustrated. The system 100 includes a remote IP enabled telephone 102 as a representative IP enabled communication device that may need to communicate with an IP enabled telephone 104 or other IP enabled communication device connected to a communications network 106. For example, the IP phone 102 may be an optiPoint™ 400 Standard IP telephone manufactured by Siemens Information and Communication Networks Inc.

The system 100 also includes a proxy device 108 in communication with the IP phone 102. According to a specific embodiment, proxy device 108 and IP phone 102 are located in the same general region (e.g., the remote location) and can be connected via a cable or via wireless connection in the remote location. The system 100 also includes a RAS (remote access service) server 110, to which proxy device 108 is connectable via a modem connection from the remote location. The RAS server 110, logically connected to network 106 allows the proxy device 108 to initiate or maintain connection or communication with the communications network 106. In addition, the apparatus 100 may include a gatekeeper or registrar device 112 that is involved when the proxy device 108, on behalf of remote IP phone 102, initiates a communication via the communications network 106.

In some embodiments, the gatekeeper device 112 for network 106 may require that the proxy device 108 provide adequate credentials that allow the gatekeeper device 112 to authenticate the proxy device 108 and/or that enable the proxy device 108 to access IP telephony services supported by the gatekeeper device 112. The gatekeeper device 112 may perform similar functions for other IP enabled communication devices (e.g., the IP phone 104) that wish to use IP telephony services supported by the gatekeeper device 112. The gatekeeper device 112 may be or include one or more computers, servers or other hardware/software device combinations that can operate to facilitate communication and remote access between the proxy device 108 and other IP enabled communication devices via the communications network 106 and to provide IP telephony services to such devices.

In some embodiments, the RAS server 110, gatekeeper device 112, and/or the IP phone 104 may be part of, or included in, the communications network 106. In some embodiments, some or all of the functions or operation of the RAS server 110 and the gatekeeper device 112 may be performed by the same device or set of devices.

The proxy device 108 may be or include one or more computers, servers or other hardware/software device combinations that can operate to facilitate communication between the remote IP phone 102 and the communications network 106. In some embodiments, the proxy device 108 may support or be connected to more than one IP enabled telephone or other IP enabled communication device (e.g., for home office or small office environments). In some embodiments, the IP phone 102 may be directly or indirectly connected to, or in communication with, the proxy device 108 via a network interface card in the proxy device 108.

The proxy device 108 may be configured with, programmed with, or otherwise know the IP address of the gatekeeper device 112 as well as an IP address or access telephone number for the RAS server 110. In some embodiments, the proxy device 108 may include one or more network interface cards that allow the proxy device 108 to be connected to and/or communicate with the IP phone 102 and/or with the RAS server 110. When the IP phone 102 is connected to the proxy device 108, the proxy device 108 may be configured or programmed with an IP address associated with the IP phone 102.

Many different types of implementations or hardware configurations can be used in the system 100 and with the methods disclosed herein and the methods disclosed herein are not limited to any specific hardware configuration for the system 100 or any of its components. For example, in some embodiments, multiple IP enabled communication devices may be connected to or in communication with the proxy device 108. As another example, in some embodiments multiple IP enabled communication devices may be temporarily or permanently connected to or part of the communications network 106. The devices shown in FIG. 1 need not be in constant communication. For example, the IP phone 102 may communicate with the proxy device 108 only when such communication is appropriate or necessary.

The IP phone 102 may be configured or programmed with its own IP address and an IP address associated with a device (e.g., the proxy device 108) that the IP phone 102 is configured to contact in order to access the communications network 106. Typically, an IP phone may have an IP address of a gatekeeper or registrar device that the IP phone will contact in order to gain access to a network associated with the gatekeeper or registrar device. In the present invention, the IP phone 102 is configured or programmed with an IP address for the proxy device 108. The proxy device 108 looks to the IP phone 102 like a gatekeeper or registrar device and facilitates communication between the IP phone 102 and the communications network 106.

In a manner similar to the IP phone 102, the IP phone 104 may be configured or programmed with its own IP address and the IP address of the gatekeeper device 112. As represented in FIG. 1, the gatekeeper device 112 facilitates communication between the IP phone 104 and the communications network 106, as is discussed in more detail below. In some embodiments, a network may have more than one gatekeeper or registrar device.

The RAS server 110 may be or include one or more computers, servers or other hardware/software device combinations that can operate to facilitate communication and remote access between the proxy device 108 and the communications network 106. In general, remote access is the ability to get access to a computer or a network from a remote distance. For example, in corporations, employees located at branch offices, telecommuters, and people who are traveling may need access to the corporation's network or devices connected to the network. Dial-up connection through desktop, notebook, or computer modem over regular telephone lines is a common method of remote access that may be used between the proxy device 108 and the RAS server 110. Remote access also may be possible using a dedicated line between the proxy device 108 and the RAS server 110. The RAS server 110 may be configured to handle users seeking access to network remotely and also may be referred to as a communication server. In some embodiments, the RAS server 110 may include or be associated with a firewall server to provide security and a router that can forward a remote access request from the proxy device 108 or another device to another part of the corporate network (e.g., the gatekeeper device 112). The RAS server 110 may include or work with a modem pool manager so that a small group of modems can be shared among a large number of intermittently present remote access users. The RAS server 110 may include several external telephone lines. The proxy device 108 may call a telephone number associated with the RAS server 110 and, once connected to the RAS server 110, pass or transmit authentication information (e.g., login, password) that provides access to the communications network 106 by the proxy device 108. While the device that allows access by the proxy device 108 to the communications network 106 in the system 100 is the RAS server 110, other embodiments may use different devices, protocols, mechanisms, or remote access techniques for the proxy device 108 to gain access to or become part of the communications network 106 and the present invention is not limited to use of a RAS server 110.

In general, the communications network 106 might be or include the Internet, the World Wide Web, and/or one or more other public or private computer, cable, telephone, IP telephony, client/server, peer-to-peer, or communications networks or intranets, corporate networks, etc. The communications network 106 may include a variety of devices (e.g., routers, database servers, application servers, Web servers, file servers, IP enabled communication devices). The communications network 106 illustrated in FIG. 1 is meant only to be generally representative communication network for purposes of elaboration and explanation of the present invention and other devices, networks, etc. may be connected to or form part of the communications network 106 without departing from the scope of the present invention. For purposes of elaboration of the present invention, the communications network 106 is assumed to be an H.323 protocol based network and, more specifically, an H.323 compatible IP telephony network. In other embodiments, different protocols may be used (e.g., SIP—Session Initiation Protocol) and different devices may be named or identified differently in systems using the different protocols. For example, the gatekeeper device 112 may be referred to as a registrar device in a system or network using SIP.

Process Description

Figure 2:
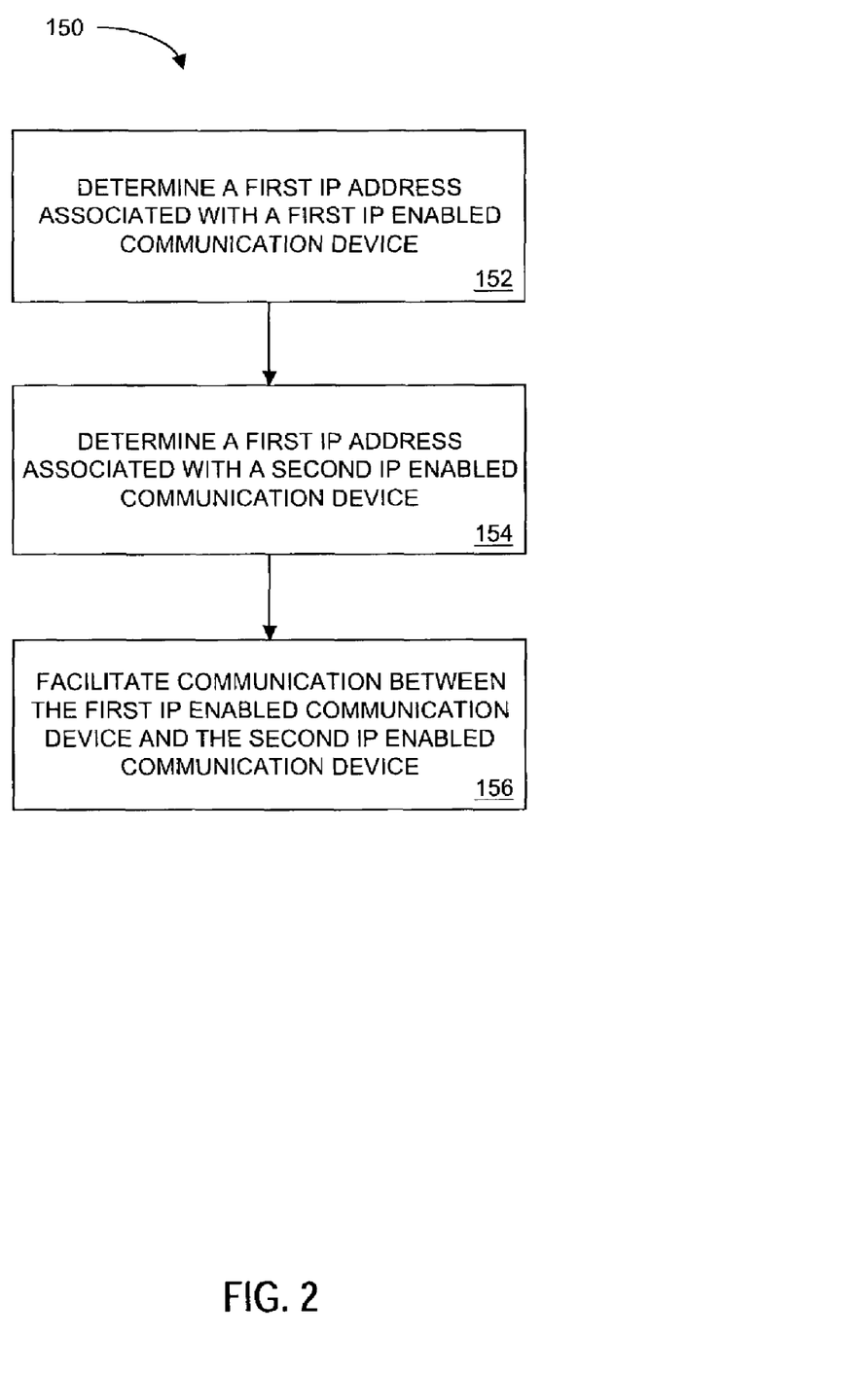
FIG. 2 is a flowchart of a first embodiment of a method in accordance with the present invention.

Reference is now made to FIG. 2, where a flow chart 150 is shown that represents the operation of a first embodiment of the present invention. The particular arrangement of elements in the flow chart 150 is not necessarily meant to imply a fixed order to the steps; embodiments of the present invention can be practiced in any order that is practicable. In some embodiments, some or all of the steps of the method 150 may be performed or completed by the proxy device 108, as will be discussed in more detail below. For purposes of the method 150, the proxy device 108 is assumed to be connected to or otherwise be part of the communications network 106. In some embodiments, the proxy device 108 may form such a connection via the RAS server 110, which may assign an IP address to the proxy device 108. The IP address assigned to the proxy device 108 by the RAS server 110 may be different from the IP address for the proxy device 108 programmed or configured into the IP phone 102. It should be noted that in the configuration illustrated in FIG. 1, all communications between the proxy device 108 and the gatekeeper device 112, and all communications between the proxy device 108 and the IP phone 104, will pass through the RAS server 110 since the proxy device 108 used the RAS server 110 to connect to or become part of the communications network 106.

In some embodiments, the proxy device 108 may use other or different devices, protocols, mechanisms, or remote access techniques to gain access to or become part of the communications network 106, and the present invention is not limited to use of the RAS server 110.

Processing begins at a step 152 during which the proxy device 108 determines an IP address associated with a first IP enabled communication device. In this example, the first IP enabled communication device will be the IP phone 102. In some embodiments, the proxy device 108 may be programmed or configured with the IP address for the IP phone 102. In other embodiments, the proxy device 108 may determine the IP address and/or other information for the IP phone 102 and/or other devices connected to the proxy device 108 based on messages the proxy device 108 receives from the IP phone 102 and/or other devices.

During a step 154, the proxy device 108 determines an IP address associated with a second IP enabled communication device. In this example, the second IP enabled communication device will be the IP phone 104. Communication between the IP phone 102 and the IP phone 104 may be done using a variety of protocols. For purposes of this example, the H.323 protocol is assumed. However, other protocols (e.g., SIP) may be used in other embodiments.

There may be numerous ways in which the proxy device 108 may determine the IP address for the IP phone 104. For example, the IP phone 102 may send a request to the proxy device 108 indicating that the IP phone 102 wishes to call a specific telephone number that is associated with the IP phone 104. The proxy device 108 may have or be able to access a database or list that relates the telephone number for the IP phone 104 with an IP address for the IP phone 104.

As another example, after the proxy device 108 receives a request from the IP phone 102 that the IP phone 102 wishes to call a specific telephone number, the proxy device 108 may send the request to the gatekeeper device 112. The gatekeeper device 112 may include or have access to a database or list that relates the specific telephone number for the IP phone 104 with an IP address for the IP phone 104. The gatekeeper device 112 may know the IP address for the IP phone 104 when the communications network 106 and/or the IP phone 104 are configured or initialized. The gatekeeper device 112 may provide the IP address for the IP phone 104 to the proxy device 108.

In some embodiments, when the proxy device 108 first accesses or registers with the communications network 106, the proxy device 108 may communicate with the gatekeeper device 112. Communications that the proxy device 108 sends to the gatekeeper device 108 will use a source IP address that identifies the proxy device 108 to the gatekeeper device 112. In some embodiments, the IP address used by the proxy device in communications to the gatekeeper device 112 may an IP address assigned to the proxy device 108 by the RAS server 110.

The gatekeeper device 112 may control or monitor which devices can register with or access the communications network 106. When the proxy device 108 registers with the gatekeeper device 112, the gatekeeper device 112 may use an IP address for the proxy device 108, which may be assigned to the proxy device 108 by the RAS server 110 as previously discussed above, and which may be in addition to, and different from, the IP address for the proxy device 108 known by or programmed into the IP phone 102. Thus, the proxy device 108 may use or be associated with one destination IP address (i.e., the IP address for the proxy device 108 programmed into the IP phone 102) for receiving communications from the IP phone 102 and a different destination IP (i.e., the IP address assigned to the proxy device 108 by the RAS server 110) address for receiving communications from the gatekeeper device 112 or other IP enabled communication devices (e.g., the IP phone 104) in the communications network 106. Similarly, the proxy device 108 may use or be associated with one source IP address (i.e., the IP address programmed into the IP phone 102) for sending communications to the IP phone 102 and a different source IP address (i.e., the IP address for the proxy device 108 assigned by the RAS server 110) for sending communications to the gatekeeper device 112 or other IP enabled communication devices in the communications network 106.

During a step 156, the proxy device 108 facilitates communication between the IP phone 102 and the IP phone 104. For example, as part of the communication between the IP phone 102 and the IP phone 104, the proxy device 108 may receive communications from the IP phone 102 and send them to the IP phone 104. In addition, the proxy device 108 may receive communications from the IP phone 104 and send them to the IP phone 102. In both situations, the proxy device 108 may modify the communications to change source and destination IP addresses. For example, when the IP phone 102 is sending a communication to the IP phone 104, the IP phone 102 may send the communication to the proxy device 108 using an IP address for the proxy device 108 previously configured or programmed into the IP phone 102 as the destination IP address in the communication and its own previously programmed IP address as the source IP address for the communication. The proxy device 108 may substitute the IP address for the IP phone 104 (which the proxy device 108 obtained during the step 154) for the destination IP address used by the IP phone 102 in the communication. In addition, the proxy device 108 may use the IP address for the proxy device 108 assigned by the RAS server 110 as the source IP address for the communication when the proxy device 108 sends the communication to the IP phone 104. In this scenario, the proxy device 108 changes the source and destination IP addresses for each communication received from the IP phone 102 prior to sending the communication to the IP phone 104.

When the IP phone 104 is sending a communication to the IP phone 102, the IP phone 104 may send the communication to the proxy device 108 using the IP address for the proxy device 108 assigned by the RAS server 110 as the destination IP address and its own previously programmed IP address as the source IP address. The proxy device 108 may substitute the IP address for the IP phone 102 (which is determined during the step 152) for the destination IP address used by the IP phone 104 in the communication. In addition, the proxy device 108 may use the IP address for the proxy device programmed into the IP phone 102 as the source IP address for the communication when the proxy device 108 sends the communication to the IP phone 102. In this scenario, the proxy device 108 changes the source and destination IP addresses for each communication received from the IP phone 104 prior to sending the communication to the IP phone 102.

In the manner discussed above, the proxy device 108 may maintain and facilitate communication between the IP phone 102 and the IP phone 104. In some embodiments, neither the IP phone 102 nor the IP phone 104, or users at such IP phones, may be able to tell or determine that the proxy device 108 is acting as an intermediary or is placed topologically between them.

Figure 3:
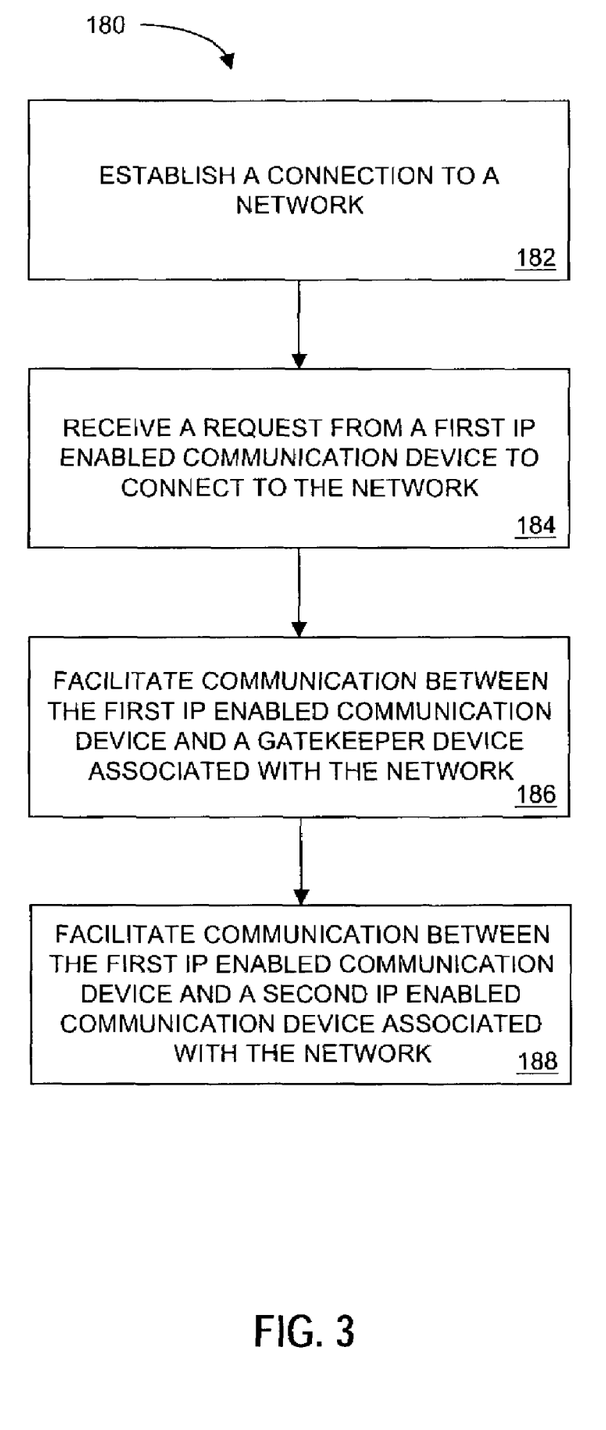
FIG. 3 is a flowchart of a second embodiment of a method in accordance with the present invention.

Reference is now made to FIG. 3, where a flow chart 180 is shown which represents the operation of a second embodiment of the present invention. The particular arrangement of elements in the flow chart 180 is not necessarily meant to imply a fixed order to the steps; embodiments of the present invention can be practiced in any order that is practicable. In some embodiments, some or all of the steps of the method 180 may be performed or completed by the proxy device 108, as will be discussed in more detail below. In some embodiments, the method 180 may include some or all of the variations discussed above with regard to the method 150.

Processing begins at a step 182 during which the proxy device 108 establishes a connection to the communications network 106. For purposes of this example, it is assumed that the proxy device 108 gains access to the communications network 106 by communicating with the RAS server 110 to create a remote access service connection to the communications network 106. As part of creating a remote access connection between the proxy device 108 and the communications network 106, the RAS server 110 may assign an IP address to the proxy device 108. As previously discussed above, the IP address assigned to the proxy device 108 by the RAS server 110 may be different from the IP address for the proxy device 108 known by or programmed into the IP phone 102.

After the remote access connection to the communications network 106 is created via the RAS server 110, the proxy device 108 may communicate with the gatekeeper device 112 for purposes of authentication and for providing credentials or other information that justify the gatekeeper device 112 allowing access by the proxy device 108 to devices included in or connected to the communications network 106. It should be noted that in the configuration illustrated in FIG. 1, all communications between the proxy device 108 and the gatekeeper device 112 will pass through the RAS server 110 since the proxy device 108 used the RAS server 110 to connect to or become part of the communications network 106.

As one example of the step 182, the proxy device 108 may establish a RAS connection with the RAS server 110 by using a telephone number associated with an incoming line on the RAS server 110 or other remote dial-in mechanism or procedure (e.g., RAS, VPN, ISDN, leased lines). After completion of the step 182 the proxy device 108 may be considered as part of the communications network 106 and have an IP address assigned by the RAS server 110 for purposes of communicating with the communications network 106 and devices (e.g., the gatekeeper device 112, IP phone 104) in the communications network 106. The proxy device 108 may then communicate with the gatekeeper device 112 as part of an authentication or registration process. The proxy device 106 may know, be pre-configured with, or have stored the IP address for the gatekeeper device 112 or may receive IP address information regarding the gatekeeper device 112. For example, in some embodiments, the proxy device 108 may initiate or perform a gatekeeper discovery process during which the proxy device 108 sends out a broadcast message, which may be referred to as a gatekeeper request (GRQ) message. The gatekeeper request message may be received by the gatekeeper device 112, which may respond back to the proxy device 108 with a gatekeeper confirm (GCF) or a gatekeeper reject (GRJ) message. A gatekeeper confirm message may include the IP address of the gatekeeper device 112 for use by the proxy device 108. As part of the gatekeeper discovery process after the gatekeeper device 112 receives the gatekeeper request message, the gatekeeper device 112 may check to determine if the proxy device 108 is allowed to access other devices on the communications network 106 or to determine if the proxy device 108 is using a valid IP address.

As previously discussed above, in some embodiments, when the proxy device 108 accesses or registers with the communications network 106, the proxy device 108 may communicate with the gatekeeper device 112, which may control or monitor which devices can register with or otherwise access some or all of the communications network 106. When the proxy device 108 registers with the gatekeeper device 112, the proxy device 108 may provide user identification information, IP address information (received by the proxy device 108 from the RAS server 110), and/or other credential information to the gatekeeper device 112. If the information is valid, the gatekeeper device 112 may allow the proxy device 108 to use IP telephony services supported by the gatekeeper device 112. Once the proxy device 108 is authenticated by the gatekeeper device 112, the proxy device 108 can communicate with other devices (e.g., the IP phone 104).

During a step 184, the proxy device 108 receives a request from the IP phone 102 to connect to the communications network 106. In some embodiments, the step 184 may occur prior to the step 182. As one example of the step 184, the IP phone 102 may send a registration request (RRQ) to the proxy device 108. The IP phone 102 may send the registration request to a destination IP address that is the IP address for the proxy device 108 that is configured or programmed into the IP phone 102 as the gatekeeper for the IP phone 102. As previously mentioned above, this IP address may be different from an IP address assigned to the proxy device 108 by the RAS server 110. The IP phone 102 will use its own previously programmed IP address as the source IP address for the registration request.

During a step 186, the proxy device 108 facilitates communication between the IP phone 102 and the gatekeeper device 112. For example, once the proxy device 108 receives the registration request from the IP phone 102 as part of the step 184, the proxy device 108 may change the destination IP address in the registration request to be that of the gatekeeper device 112 instead of the proxy device 108. In addition, the proxy device 108 may change the source address in the communication to be the IP address assigned to the proxy device 108 by the RAS server 110. The proxy device 108 may then send the modified registration request to the gatekeeper device 112.

The registration request may include a login, password, the IP address for the proxy device 108 assigned by the RAS server 110, and/or other credential information. In response to the registration request received from the proxy device 108, the gatekeeper device 112 may either accept the registration request received from the proxy device 108, thereby allowing the proxy device 108 to access or communicate with other devices in the communications network 106, or reject the registration request received from the proxy device 108. Thus, the gatekeeper device 112 may send either a registration confirm (RCF) or a registration rejection (RRJ) to the proxy device 108 regarding the registration request. The destination IP address used by the gatekeeper device 112 for the proxy device 108 in the registration confirm or registration rejection will be the IP address for the proxy device 108 assigned by the RAS server 110. The gatekeeper device 112 will use its own IP address as the source IP address in the registration confirm or registration rejection.

Upon receiving the registration confirm or registration rejection indication or message from the gatekeeper device 112, the proxy device 108 may change the destination IP address in the indication or message to be the IP address for the IP phone 102 instead of the IP address for the proxy device assigned by the RAS server 110. In addition, the proxy device 108 may change the source IP address in the communication to be the IP address for the proxy device 108 programmed into the IP phone 102 instead of the IP address for the gatekeeper device 112. The proxy device 108 may then send the indication or message to the IP phone 102. If the gatekeeper device 112 has allowed registration of the proxy device 108, the IP phone 102 is registered with the gatekeeper device 108 under the guise or proxy of the proxy device 108. The IP phone 102 may then initiate other messaging to the gatekeeper device 112 via the proxy device 108 to initiate communication with the IP phone 104 or other devices included in the communications network 106.

Conceptually, during the step 186, the proxy device 108 acts as the gatekeeper device for or in the view of the IP phone 102. Similarly, during the step 186, the proxy device 108 acts in view of the gatekeeper device 112 as an IP enabled communication device that desires to communicate with at least one other device in the communications network 106. In some embodiments, the actions of the proxy device 108 in swapping or exchanging (e.g., substituting) source and/or destination IP addresses during the step 186 may be transparent or otherwise unknown to the IP phone 102 and/or the gatekeeper device 112.

During a step 188, assuming that the proxy device 108 has registered with the gatekeeper device 112 and/or that the gatekeeper device 112 has allowed the proxy device 108 to communicate with other devices in the communications network 106, the proxy device 108 facilitates communication between the IP phone 102 and the IP phone 104. The step 188 is similar to the step 156 previously discussed above. It should be noted that in the configuration illustrated in FIG. 1, all communications between the proxy device 108 and the IP phone 104 will pass through the RAS server 110 since the proxy device 108 used the RAS server 110 to connect to or become part of the communications network 106.

Conceptually, during the step 188 the proxy device 108 acts as the IP phone 104 in the view of the IP phone 102. Similarly, during the step 188, the proxy device 108 acts as the IP phone 102 in the view of the IP phone 104. In some embodiments, the actions of the proxy device 108 in swapping or exchanging source and/or destination IP addresses during the step 188 may be transparent or otherwise unknown to the IP phone 102 and/or the IP phone 104.

In some embodiments, the proxy device 108 may have or include multiple network interface cards, one of which the proxy device 108 uses to communicate with the IP phone 102 and the other of which the proxy device 108 uses to communicate with the RAS server 110, the gatekeeper device 112, the IP phone 104, etc. In addition, the first network interface card may be associated or programmed with the IP address for the proxy device 108 configured or programmed into the IP phone 102. The second network interface card may be associated with the IP address for the proxy device assigned by the RAS server 110.

Each of the network interface cards in the proxy device 108 may have multiple ports that the proxy device 108 can use for communication. For example, the proxy device 108 may use four ports (e.g., two TCP ports and two UDP ports) on a first network interface card to communicate with the IP phone 102 and four ports (e.g., two TCP ports and two UDP ports) on a second network interface card to communicate with the RAS server 110, the gatekeeper device 112, the IP phone 104, etc. The proxy device 108 may use one TCP (Transmission Control Protocol) port on a network interface card for H.225 signaling and one TCP port on the same network interface card for H.245 signaling as part of some communications in or via an H.323 compliant network. Similarly, the proxy device 108 may use one UDP (Universal Datagram Protocol) port on a network interface card for RTP (Real-Time Transport Protocol) signaling and one UDP port on a network interface card for RTCP (Real-Time Control Protocol) signaling as part of some communications in or via an H.323 compliant network. In some embodiments, after a call is established between the IP phone 102 and the IP phone 104, either of the devices may invoke H.450 type services such as call transfer, conferencing, hold, etc.

In some embodiments, for purposes of communications between the proxy device 108 and the IP phone 102, a gatekeeper routing format or protocol may be used since the proxy device 108 is acting as the gatekeeper for the IP phone 102. Similarly, for purposes of communications between the proxy device 108 and the IP phone 104, a directed routing format or protocol may be used since not all communications between the proxy device 108 and the IP phone 104 are being routed through the gatekeeper device 112.

Figure 4:
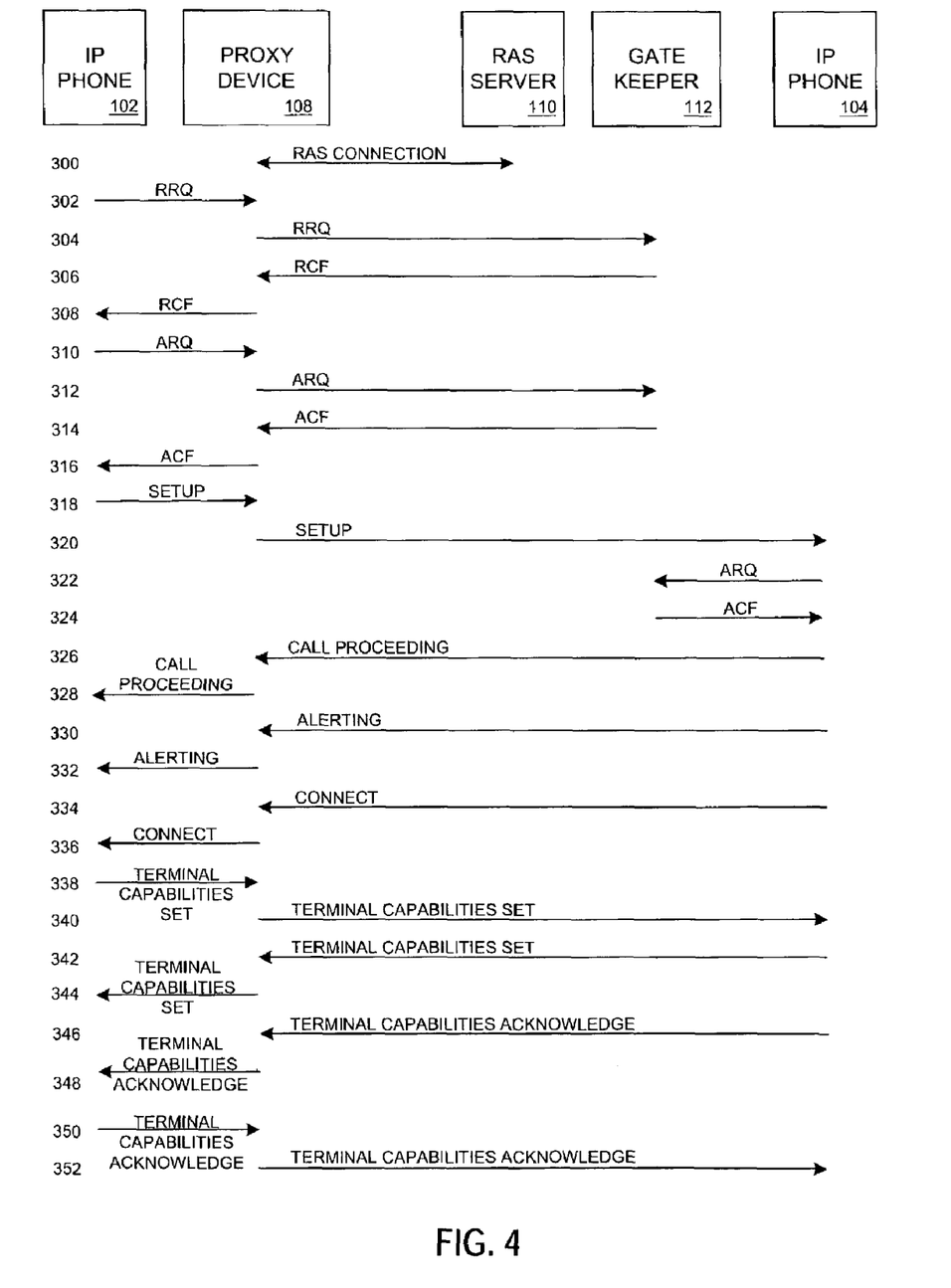
FIGS. 4 and 5 are an illustration of one potential implementation of the methods of the present invention.
Figure 5:
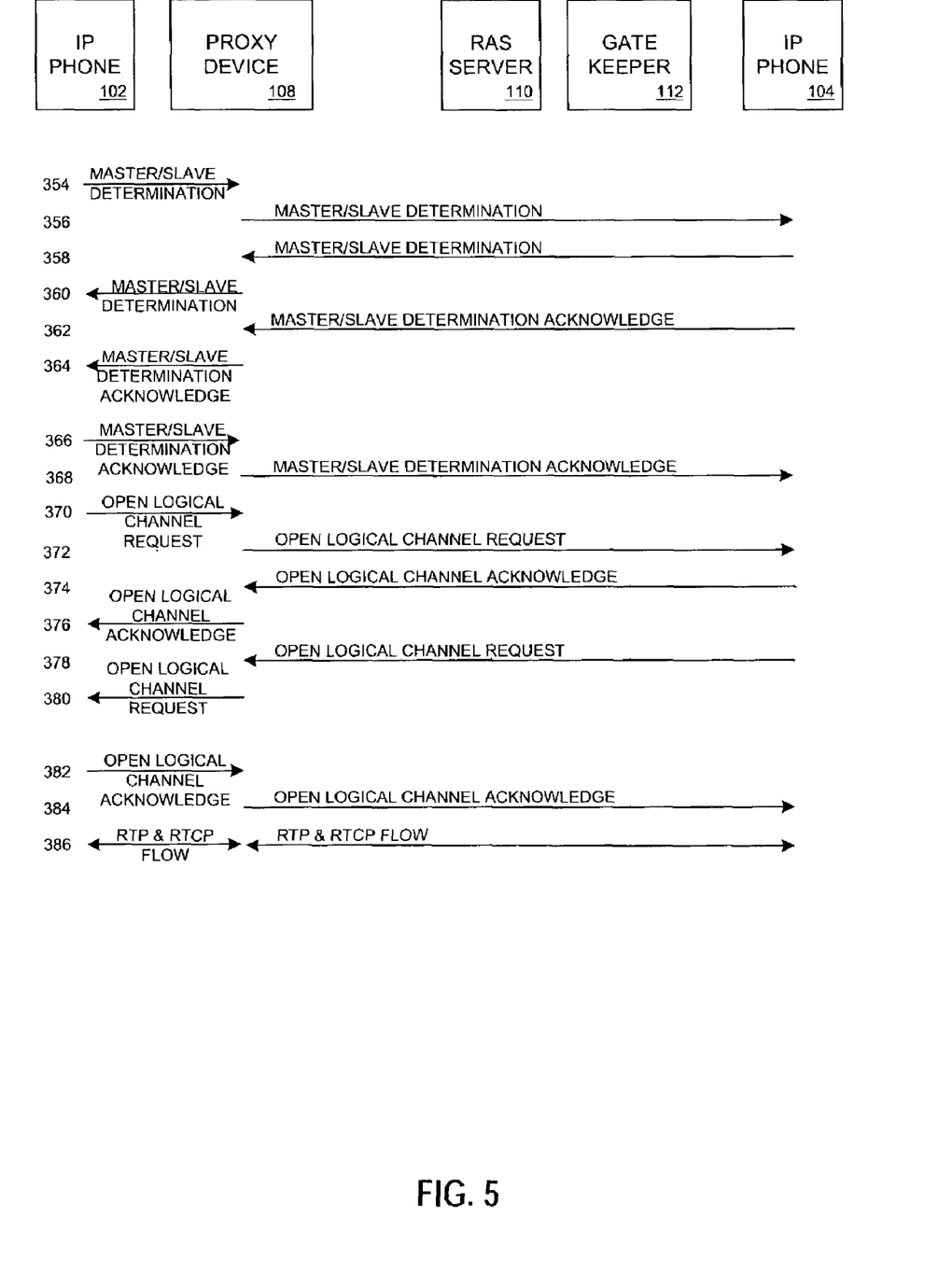

Now referring to FIGS. 4 and 5, a more detailed example of communication facilitated by the proxy device 108 between the IP phone 102 and the IP phone 104 will now be discussed. For purposes of this example, the communications network 106 is assumed to be an H.323 protocol based network. In addition, the example assumes that the IP phone 102 is configured or programmed with its own IP address that is known to the proxy device 108 and with an IP address for the proxy device 108. In addition, the example assumes that the proxy device 108 is configured or programmed with, or otherwise knows (e.g. by the use of a gatekeeper request message or gatekeeper discovery process), the IP address for the gatekeeper device 112, and that the gatekeeper device 112 is configured or programmed with, or can otherwise determine, the IP address for the IP phone 104. In addition, the example assumes that the IP phone 104 is configured or programmed with the IP address for the gatekeeper device 112.

As part of messaging between devices, a message will include a source IP address for the device originating the message and a destination IP address for the device the message is being sent to.

During a step 300 the proxy device 108 initiates a remote access connection with the RAS server 110 as previously discussed above in relation to the step 182 in FIG. 3. For purposes of this example, the proxy device 108 will initiate the remote access connection with the RAS server 110 by using a dial-up telephone line and calling a telephone number associated with the RAS server 110. As part of establishing the remote access connection, the RAS server 110 may assign an IP address to the proxy device 108.

During a step 302, the proxy device 108 receives a registration request (RRQ) message from the IP phone 102 as previously discussed above in relation to the step 184 in FIG. 3. The IP phone 102 will send the registration request message to the IP address for the proxy device 108 previously configured or programmed into the IP phone 102. The registration request will include the IP address for the IP phone 102 as the source IP address and the IP address for the proxy device 108 programmed into the IP phone 102 as the destination IP address (e.g., the gatekeeper address for the IP phone 102 since the proxy device 108 is acting as the gatekeeper for the IP phone 102). The registration request message from the IP phone 102 lets the proxy device 108 know that the IP phone 102 is active and available.

During a step 304, the proxy device 108 exchanges the IP address for the gatekeeper device 112 for its IP address (i.e., the destination IP address used by the IP phone 102) as the destination IP address. In addition, the proxy device 108 exchanges the IP address for the IP phone 102 for the IP address assigned to the proxy device 108 by the RAS server 110 as the source IP address in the registration request message. The proxy device 108 then sends the modified registration request message to the gatekeeper device 112, as previously discussed above in relation to the step 186 in FIG. 3. The modified registration request message sent to the gatekeeper device 112 lets the gatekeeper device 112 know that the proxy device 108 is active and available.

During a step 306, assuming that the gatekeeper device 112 approves or consents to registration of the proxy device 108, the gatekeeper device 112 sends a registration confirm (RCF) message to the proxy device 108 using the IP address for the proxy device 108 assigned by the RAS server 110 as the destination IP address and the IP address for the gatekeeper device 112 as the source IP address. If the gatekeeper device 112 does not approve or consent to registration of the proxy device 108, the gatekeeper device 112 will send a registration rejection (RRJ) message to the proxy device 108.

During a step 308, assuming that the proxy device 108 received a registration confirm message from the gatekeeper device 112, the proxy device 108 will exchange the IP address for the IP phone 102 for its IP address (i.e., the IP address assigned by the RAS server 110 during the step 300) in the destination IP address used in the registration confirm message sent by the gatekeeper device 108. In addition, the proxy device 108 will use the IP address for the proxy device 108 programmed into the IP phone 102 as the source IP address for the registration confirm message instead of the IP address of the gatekeeper device 112. The proxy device 108 may then send the modified registration confirm message to the IP phone 102. As a result, the IP phone 102 is registered with the proxy device 108 (which is acting as the gatekeeper for the IP phone 102) and the proxy device 108 is registered with the gatekeeper device 112, thereby giving the IP phone 102 the impression that it is registered with the gatekeeper 112.

At some point prior to a step 310, the IP phone 104 may communicate with the gatekeeper device 112 by sending a registration request (RRQ) to the gatekeeper device 112. The registration request messages lets the gatekeeper device 112 know that the IP phone 104 is available and active and allows the gatekeeper device 112 to verify the IP address for the IP phone 104. Such registration request and registration confirm messages between the IP phone 104 and the gatekeeper device 112 may occur at many different times prior to the step 310 and/or prior to one or more of the steps 300, 302, 304, 306, and 308.

During a step 310, the IP phone 102 initiates a call to the IP phone 104 by sending an admission request (ARQ) message to the proxy device 108 using the IP address for the proxy device 108 previously configured or programmed into the IP phone 102 as the destination (e.g., gatekeeper) IP address and the IP address for the IP phone 102 as the source IP address. The IP phone 102 may initiate sending of the admission request message by dialing or calling the telephone number of the IP enabled communication device with which the IP phone 102 wishes to communicate. In this example, the IP phone 102 calls the telephone number associated with the IP phone 104 that initiates sending of the admission request message to the proxy device 108. The admission request message may include the telephone number called or dialed by the IP phone 102 or other alias for the IP phone 104 previously programmed or configured into the IP phone 102.

During a step 312, the proxy device 108 exchanges the IP address for the gatekeeper device 112 for its IP address (i.e., the IP address for the proxy device 108 programmed into IP phone 102) as the destination IP address in the admission request message. In addition, the proxy device 108 substitutes the IP address assigned to the proxy device 108 by the RAS server 110 as the source IP address instead of the IP address for the IP phone 102. The proxy device 108 then may send the modified admission request message to the gatekeeper device 112.

During a step 314, the gatekeeper device 112 sends an admission confirm (ACF) message to the proxy device 108 using the IP address for the proxy device 108 assigned by the RAS server 110 as the destination IP address and the IP address for the gatekeeper device 112 as the source IP address. The admission confirm message sent to the proxy device 108 may include the IP address for the IP phone 104. The gatekeeper device 112 may determine the IP address for the IP phone 104 based on the telephone number or other alias information provided in the admission request message received from the proxy device 108.

During a step 316, the proxy device 108 exchanges the IP address for the IP phone 102 for its IP address (i.e., the IP address assigned by the RAS server 110 during the step 300) as the destination IP address in the admission confirm message. In addition, the proxy device 108 exchanges the IP address for the proxy device 108 programmed into the IP phone 102 for the IP address of the gatekeeper device 112 as the source IP address for the admission confirm message. Even though the proxy device 108 now knows the IP address of the IP phone 104, the proxy device 108 might not provide this information to the IP phone 102. Rather, the proxy device 108 may further modify the admission request message to indicate to the IP phone 102 that the IP address for the IP phone 104 is the same IP address for the proxy device 108. In this manner, messages that the IP phone 102 is directing to the IP phone 104 will, in fact, be sent to the proxy device 108. The proxy device 108 may then send the modified admission confirm message to the IP phone 102.

Now that the IP phone 102 knows both the IP address for the proxy device 108 and the IP address for the IP phone 104, the IP phone 102 may treat the proxy device 108 as both its gatekeeper device and as the destination client (e.g., the IP phone 104) since the IP phone 102 is using the same destination IP address for messages sent to the proxy device 108 and to the IP phone 104.

During a step 318, the IP phone 102 sends a setup message to the proxy device 108 using the IP address for the IP phone 102 as the source IP address and the IP address for the proxy device 108 (as substituted by the proxy device 108 for the IP address for the IP phone 104 in the admission confirm message sent by the proxy device 108 to the IP phone 102 during the step 316) as the destination IP address.

During a step 320, the proxy device 108 substitutes the IP address for the proxy device 108 assigned by the RAS server 110 for the source IP address in the setup message received from the IP phone 102 and the IP address for the IP phone 104 as the destination IP address in the setup message received from the IP phone 102. The proxy device 108 also may place an alias for the proxy device 108 in the modified set up message. The proxy device 108 may then send the modified setup message to the IP phone 104.

During steps 322 and 324, the IP phone 104 may communicate with the gatekeeper device 112 using admission request (ARQ) and admission confirm (ACF) messages. In the admission request message that the IP phone 104 sends to the gatekeeper device 112, the IP phone 104 may include the alias for the proxy device 108 used by the proxy device 108 in the modified set up message sent by the proxy device 108 to the IP phone 104 during the step 320. The gatekeeper device 112 may determine or verify an IP address associated with the alias for the proxy device 108, which typically will be the IP address assigned to the proxy device 108 by the RAS server 110. Once the gatekeeper device 112 has determined or verified the IP address for the proxy device 108, the gatekeeper device 112 may send the admission confirm message to the IP phone 104 that includes the IP address for the proxy device 108 that the IP phone 104 may use as the destination IP address when communicating directly with the proxy device 108.

During a step 326, the IP phone 104 returns a call proceeding message to the proxy device 108 that indicates that the IP phone 104 received the setup message from the proxy device 108. The call proceeding message from the IP phone 104 uses the IP address for the IP phone 104 as the source IP address and the IP address for the proxy device 108 assigned by the RAS server as the destination IP address.

During a step 328, the proxy device 108 substitutes the IP address for the IP phone 102 as the destination IP address in the call proceeding message received from the IP phone 104. In addition, the proxy device 108 substitutes the IP address for the proxy device 108 previously programmed into the IP phone 102 as the source IP address in the call proceeding message received from the IP phone 104. The proxy device 108 may then send the modified call proceeding message to the IP phone 102.

During a step 330, the IP phone 104 sends an alerting message to the proxy device 108 that indicates that the IP phone 104 is ringing. The alerting message will include the IP address for the IP phone 104 as the source IP address and the IP address for the proxy device 108 assigned by the RAS server 110 as the destination IP address.

During a step 332, the proxy device 108 substitutes (e.g., exchanges) the IP address for the IP phone 102 as the destination IP address in the alerting message received from the IP phone 104. In addition, the proxy device 108 substitutes the IP address for the proxy device 108 previously programmed into the IP phone 102 as the source IP address in the alerting message received from the IP phone 104. The proxy device 108 may then send the modified alerting message to the IP phone 102.

During a step 334, the IP phone 104 sends a connect message to the proxy device 108 that indicates that the IP phone 104 has answered. The connect message will include the IP address for the IP phone 104 as the source IP address and the IP address for the proxy device assigned by the RAS server 110 as the destination IP address.

During a step 336, the proxy device 108 substitutes the IP address for the IP phone 102 as the destination IP address in the connect message received from the IP phone 104. In addition, the proxy device 108 substitutes the IP address for the proxy device 108 previously programmed into the IP phone 102 as the source IP address in the connect message received from the IP phone 104. The proxy device 108 may then send the modified connect message to the IP phone 102.

During a step 338, the IP phone 102 sends a terminal capabilities set message to the proxy device 108 using the IP address for the IP phone 102 as the source IP address and the IP address for the proxy device 108 (as substituted by the proxy device 108 for the IP address for the IP phone 104 in the admission confirm message sent by the proxy device 108 to the IP phone 102 during the step 316) as the destination IP address. The terminal capabilities set message may indicate the codec settings, compression ratios, or other settings that the IP phone 102 may use for communications.

During a step 340, the proxy device 108 substitutes the IP address for the proxy device 108 assigned by the RAS server 110 for the source IP address in the terminal capabilities set received from the IP phone 102 and the IP address for the IP phone 104 as the destination IP address in the setup message received from the IP phone 102. The proxy device 108 may then send the modified terminal capabilities set message to the IP phone 104.

During a step 342, the IP phone 104 sends a terminal capabilities set message to the proxy device 108 that may indicate the codec settings, compression rations, or other settings that the IP phone 104 may used for communications. The terminal capabilities set message will include the IP address for the IP phone 104 as the source IP address and the IP address for the proxy device assigned by the RAS server 110 as the destination IP address.

During a step 344, the proxy device 108 substitutes the IP address for the IP phone 102 as the destination IP address in the terminal capabilities set message received from the IP phone 104. In addition, the proxy device 108 substitutes the IP address for the proxy device 108 previously programmed into the IP phone 102 as the source IP address for the terminal capabilities set message received from the IP phone 104. The proxy device 108 may then send the modified terminal capabilities set message to the IP phone 102.

During a step 346, the IP phone 104 sends a terminal capabilities acknowledge message to the proxy device 108 that may indicate that the IP phone 104 received the terminal capabilities set message sent by the proxy device 108 during the step 340. The terminal capabilities acknowledge message will include the IP address for the IP phone 104 as the source IP address and the IP address for the proxy device assigned by the RAS server 110 as the destination IP address.

During a step 348, the proxy device 108 substitutes the IP address for the IP phone 102 as the destination IP address in the terminal capabilities acknowledge message received from the IP phone 104. In addition, the proxy device 108 substitutes the IP address for the proxy device 108 previously programmed into the IP phone 102 as the source IP address for the terminal capabilities acknowledge message received from the IP phone 104. The proxy device 108 may then send the modified terminal capabilities acknowledge message to the IP phone 102.

During a step 350, the IP phone 102 sends a terminal capabilities acknowledge message to the proxy device 108 using the IP address for the IP phone 102 as the source IP address and the IP address for the proxy device 108 (as substituted by the proxy device 108 for the IP address for the IP phone 104 in the admission confirm message sent by the proxy device 108 to the IP phone 102 during the step 316) as the destination IP address.

During a step 352, the proxy device 108 substitutes the IP address for the proxy device 108 assigned by the RAS server 110 for the source IP address in the terminal capabilities acknowledge message received from the IP phone 102 and the IP address for the IP phone 104 as the destination IP address in the terminal capabilities acknowledge message received from the IP phone 102. The proxy device 108 may then send the modified terminal capabilities acknowledge message to the IP phone 104.

In a matter similar to the steps 338-352, the proxy device 108 will facilitate communication of master/slave determination messages between the IP phone 102 and the IP phone 104 during steps 354, 356, 358, and 360. Similarly, the proxy device 108 will facilitate communication of master/slave determination acknowledgement messages between the IP phone 102 and the IP phone 104 during steps 362, 364, 366, and 368.

In a matter similar to the steps 338-352, the proxy device 108 will facilitate communication of open logical channel request messages and open logical channel acknowledgement messages between the IP phone 102 and the IP phone 104 during steps 370, 372, 374, 376, 378, 380, 382, and 384.

After completion of the step 384, a call is established between the IP phone 102 and the IP phone 104 in accordance with H.323 protocols. Voice and other communications between the IP phone 102 and the IP phone 104 may be facilitated by the proxy device 108 as part of the step 386 in a manner similar to that described above.

If one of the IP phones 102 or 104 is later used to terminate the call, the proxy device 108 may facilitate termination of the call and H.323 protocol compliant messaging between the IP phones 102 and 104 in a manner similar to that described above. For example, the proxy device 108 may facilitate the communication of close logical channel messages, close logical channel acknowledgement, end session, and release complete messages between the IP phone 102 and the IP phone 104. In addition, the proxy device 108 may facilitate communication of disconnection request and disconnection confirm messages between the IP phone 102 and the gatekeeper device 112.

Figure 6:
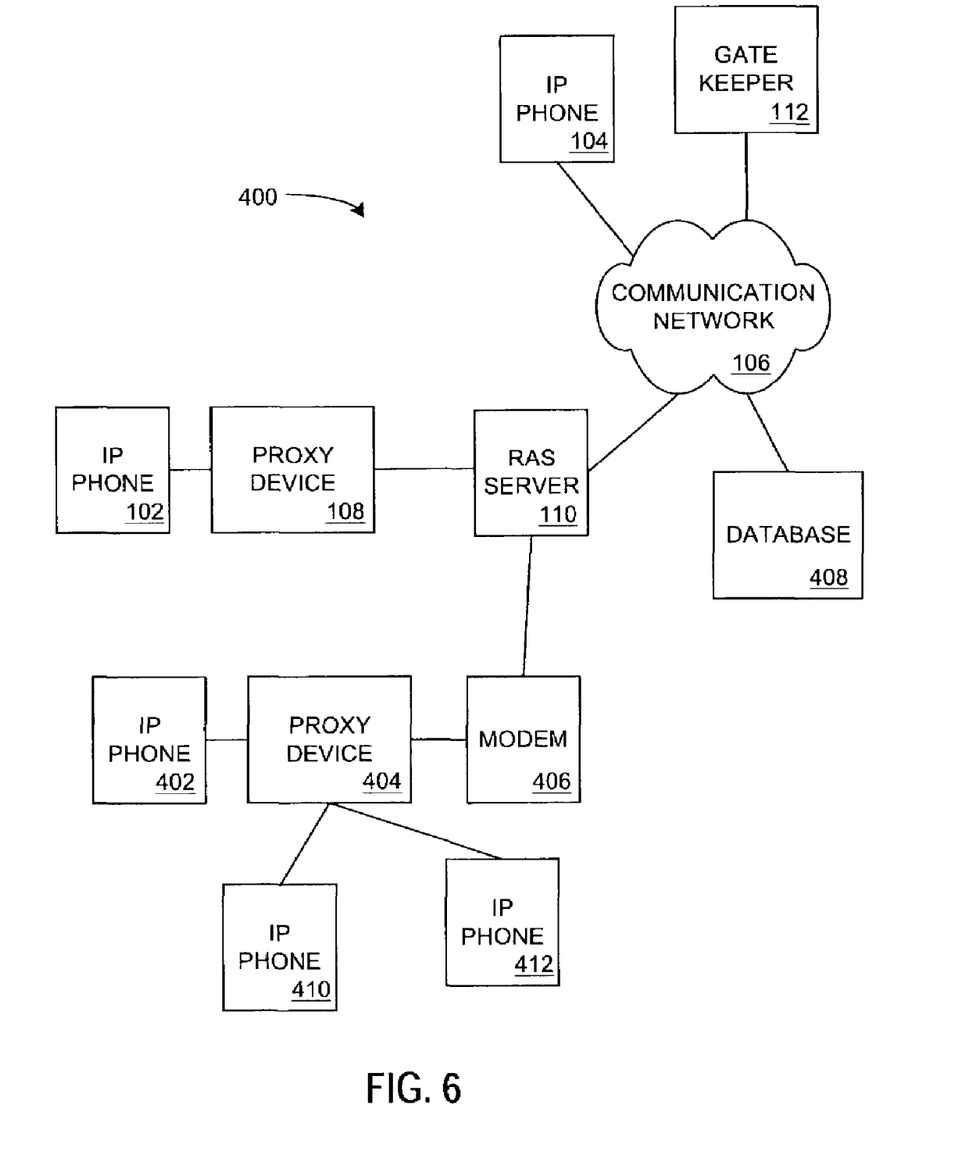
FIG. 6 is another block diagram of system components of some embodiments of an apparatus usable with the methods of the present invention.

Now referring to FIG. 6, another potential system 400 is illustrated that shows other devices that may initiate communications with the IP phone 102 or be the destination client for communications initiated by the IP phone 102. For example, the system 400 may include another IP phone 402 that can gain access to the communications network 106 via proxy device 404 (that may operate in a manner similar to the proxy device 108) and a modem 406. In addition, the system 400 includes a database server or other device 408 that may be included in or be part of the communications network 106. The proxy device 404 may also have multiple IP phones 410 and 412 connected directly or indirectly to it. The IP phone 102 may initiate communications with the IP phones 402, 410, 412 and the database server 408 in a manner similar to that described above. In addition, the IP phone 402 may initiate communications with the IP phones 102, 410, 412, and the database server 408 in a manner similar to that described above. In some embodiments, the proxy device 108 also may have more than one IP phone connected to it.

Proxy Device

Figure 7:
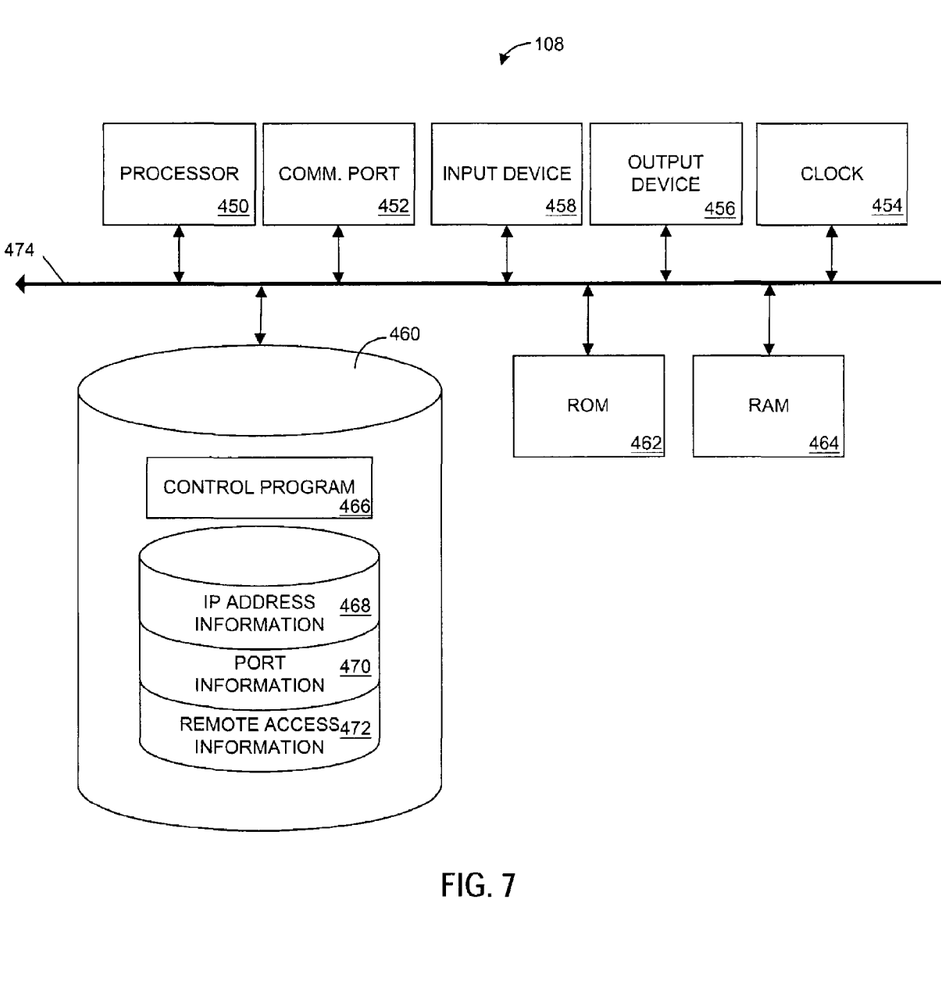
FIG. 7 is a block diagram of potential components of some embodiments of the proxy device of FIG. 1.

Now referring to FIG. 7, a representative block diagram of a proxy device 108 is illustrated. The proxy device 108 may include a processor, microchip, central processing unit, or computer 450 (such as a personal computer) that is in communication with or otherwise uses or includes one or more communication ports 452 for communicating with user devices and/or other devices. Communication ports may include such things as local area network adapters, wireless communication devices, network interface card ports, Bluetooth technology, etc. The proxy device 108 also may include an internal clock element 454 to maintain an accurate time and date for the proxy device 108, create time stamps for communications received or sent by the proxy device 108, etc.

If desired, the proxy device 108 may include one or more output devices 456 such as a printer, infrared or other transmitter, antenna, audio speaker, display screen or monitor, text to speech converter, etc., as well as one or more input devices 458 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the proxy device 108 may include a memory or data storage device 460 to store information, software, databases, communications, device drivers, ports, IP addresses, etc. The memory or data storage device 460 may comprise an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The proxy device 108 also may include separate ROM 462 and RAM 464.

The processor 450 and the data storage device 460 in the proxy device 108 each may be, for example: (i) located entirely within a single computer or other computing device; or (ii) connected to each other by a remote communication medium, such as a serial port cable, telephone line or radio frequency transceiver. In one embodiment, the proxy device 108 may comprise one or more computers that are connected to a remote server computer for maintaining databases.

A conventional personal computer or workstation with sufficient memory and processing capability may be used as the proxy device 108. The proxy device 108 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 450. Equivalent or other processors may be available from Motorola, Inc., AMD, or Sun Microsystems, Inc. The processor 450 also may comprise one or more microprocessors, computers, computer systems, etc.

Software may be resident and operating or operational on the proxy device 108. The software may be stored on the data storage device 460 and may include a control program 466 for operating the proxy device 108, databases, etc. The control program 466 may control the processor 450. The processor 450 preferably performs instructions of the control program 466, and thereby operates in accordance with the present invention, and particularly in accordance with the methods described in detail herein. The control program 466 may be stored in a compressed, uncompiled and/or encrypted format. The control program 466 furthermore includes program elements that may be necessary, such as an operating system, a database management system and device drivers for allowing the processor 450 to interface with peripheral devices, databases, etc. Appropriate program elements are known to those skilled in the art, and need not be described in detail herein.

The proxy device 108 also may include or store information regarding devices, ports, IP addresses, remote access procedures, communications, etc. For example, information regarding one or more IP addresses may be stored in an IP address information file or database 468 for use by the proxy device 108 or another device or entity. Information regarding one or more ports may be stored in a port information file or database 470 for use by the proxy device 108 or another device or entity and information regarding remote access procedures may be stored in a remote access information file or database 472 for use by the proxy device 108 or another device or entity. In some embodiments, some or all of one or more of the files or databases may be stored or mirrored remotely from the proxy device 108.

According to an embodiment of the present invention, the instructions of the control program may be read into a main memory from another computer-readable medium, such as from the ROM 462 to the RAM 464. Execution of sequences of the instructions in the control program causes the processor 450 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 450, communication port 452, clock 454, output device 456, input device 458, data storage device 460, ROM 462, and RAM 464 may communicate or be connected directly or indirectly in a variety of ways. For example, the processor 450, communication port 452, clock 454, output device 456, input device 458, data storage device 460, ROM 462, and RAM 464 may be connected via a bus 474.

While specific implementations and hardware configurations for the proxy device 108 have been illustrated, it should be noted that other implementations and hardware/software configurations are possible and that no specific implementation or hardware/software configuration is needed. Thus, not all of the components illustrated in FIG. 7 may be needed for a device implementing the methods disclosed herein.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed:

1. A method for facilitating communication between IP enabled communication devices over a network, comprising:
   establishing a connection to a network by a proxy device such that a first IP address is received by said proxy device as part of said connection;
   authenticating said proxy device with a gatekeeper device that controls communication with a second IP enabled device associated with said network;
   receiving, by the proxy device, a request from a first IP enabled communication device to connect to said network, wherein said first IP enabled communication device is associated with a second IP address;
   receiving a communication from said first IP enabled communication device by the proxy device, said communication using said second IP address as a source address and a third IP address as a destination address; and
   sending said received communication having said second IP address as the source address and said third IP address as the destination address from said proxy device to the second IP enabled communication device, said sent communication using said first IP address as the source IP address and a fourth IP address as the destination address for said communication being sent to said second IP enabled communication device.

2. The method of claim 1, wherein said network include an IP telephony network.

3. The method of claim 1, wherein said first IP enabled communication device is an IP enabled telephone.

4. The method of claim 1, wherein said device associated with said network functions as a gatekeeper for said network.

5. The method of claim 1, further comprising:
facilitating communication between said IP enabled communication device and a second IP enabled communication device, wherein said second IP enabled communication device is associated with a fifth IP address.

6. The method of claim 1, further comprising:
receiving a communication from said first IP enabled communication device, said communication using said second IP address as a source address and said third IP address as a destination IP address; and
sending said communication to said second IP enabled device, said communication using said first IP address as a source IP address and said a fifth IP address as a destination IP address for said communication being sent to said second IP enabled device.

7. The method of claim 6, further comprising:
receiving a communication from said second IP enabled communication device, said communication using said fifth IP address as a source IP address and said first IP address as a destination IP address for said communication being received from said second IP enabled communication device;
sending said communication to said first IP enabled communication device, said communication using said second IP address as a destination IP address and said third IP address as a source IP address for said communication being sent to said first IP enabled communication device.

8. The method of claim 1, wherein said facilitating communication between said first IP enabled communication and a said first device associated with said network includes receiving a communication from said first device associated with said network using said fourth IP address as a source IP address and said first IP address as a destination IP address and sending said communication to said first IP enabled communication device using said second IP address as a destination IP address and said third IP address as a source IP address for said communication being sent to said first IP enabled communication device.

* * * * *